United States Patent [19]
Chujo

[11] Patent Number: 5,899,574
[45] Date of Patent: * May 4, 1999

[54] SUPPORTING STRUCTURE OF BEARINGS

[75] Inventor: Masaki Chujo, Anjo, Japan

[73] Assignee: Aisin Seiki Kabushiki Kaisha, Japan

[21] Appl. No.: 08/594,291

[22] Filed: Jan. 30, 1996

[30] Foreign Application Priority Data

Jan. 30, 1995 [JP] Japan ..................... 7-12970

[51] Int. Cl.⁶ .................................... F16C 33/66
[52] U.S. Cl. .......................... 384/518; 384/906
[58] Field of Search ...................... 384/517, 518,
384/563, 906, 496, 558

[56] References Cited

U.S. PATENT DOCUMENTS 4,227,758  10/1980  Lundberg ......................... 384/518

FOREIGN PATENT DOCUMENTS

| 452793 | 11/1927 | Germany. |
| 459515 | 5/1928 | Germany. |
| 849047 | 9/1952 | Germany. |
| A046654 | 12/1958 | Germany. |
| A-2942008 | 4/1981 | Germany. |
| 0160621 | 9/1983 | Japan ..................... 384/517 |
| 2-91492 | 3/1990 | Japan. |
| 6-212987 | 8/1994 | Japan. |
| 1223398 | 11/1969 | United Kingdom. |
| 2057068 | 6/1980 | United Kingdom. |
| 2076478 | 7/1980 | United Kingdom. |

OTHER PUBLICATIONS

British Search Report, dated Apr. 23, 1996, in corresponding application No. GB 9601734.8.
British Search Report, dated Apr. 23, 1996, in corresponding application No. GB 9601734.8.

Primary Examiner—Charles A. Marmor
Assistant Examiner—Matthew A. Kaness
Attorney, Agent, or Firm—Hazel & Thomas, P.C.

[57] ABSTRACT

A supporting structure of bearings incorporates a housing, a shaft on which a rotor is fixed, a first ball bearing supported on the housing supporting one side of the shaft and having an outer and inner race, a second ball bearing supported on the housing supporting the other side of the shaft and having an outer and an inner race, an elastic member for urging the outer race of the second ball bearing in the axial direction, and a ring spacer having at least one radial projecting portion disposed between the elastic member and the outer race of the second ball bearing. The outer race and the inner race of the first ball bearing are fixed to the housing and the shaft. The outer race of the second ball bearing is slidably mounted to the housing, while the inner race of the second ball bearing is fixed to the shaft. The ring spacer also includes an axial groove formed on the housing for receiving the radial projecting portion whereby the radial projecting portion slides along the axial groove.

5 Claims, 5 Drawing Sheets

SUPPORTING STRUCTURE OF BEARINGS

BACKGROUND OF THE INVENTION

1. Field of the Invention

The present invention relates to a supporting structure of bearings for a rotor which is supported at more than two points, and more particularly in a supporting structure of bearings which is used to a mechanical supercharger such as a roots-typed mechanical supercharger.

2. Description of the Prior Art

A conventional supporting structure of bearings of this kind is disclosed in, for example, Japanese patent application laid-open publication No. 2 (1990)-91492. FIG. 4 shows a roots-typed mechanical supercharger which is disclosed in this prior publication. Referring to FIG. 4, rotors 101, 102 are fixed on shafts 103, 104, respectively the shafts 103, 104 are rotatably supported on a housing 115 and on a bearing housing 116 at both sides of the rotors 101, 102 through radial ball bearings 106, 107, 108 and 109, respectively. At one end of the shaft 103, a driving pulley 110 is fixed thereto. The other end of the shaft 103 is projected into a gear chamber 112 which is formed by the securing a cover 111 to the bearing housing 116. A timing gear 113 is fixed to the other end of the shaft 103 in the bearing housing 116. The other end of the shaft 104 is projected into the gear chamber 112 and a timing gear 114 which is engaged with the timing gear 113 is fixed to the other end of the shaft 104. The timing gears 113, 114 permit the rotors 101, 102 to rotate simultaneously while maintaining a predetermined clearance therebetween without contacting with each other. Inner races of the radial ball bearings 106, 107, 108 and 109 are fitted on the shafts 103, 104 so as not to be able to move relative to the shafts 103, 104, respectively. Outer races of the radial bearings 107, 109 are fitted into receiving holes of the bearing housing 116 so as not to be able to move relative to the bearing housing 116. The outer races of the radial bearings 106 and 108 are fitted into receiving holes of the housing 115 so as to be able to move in the axial direction. Cone springs 117, 118 are disposed between bottom surfaces of the receiving holes of the housing 115 and the radial ball bearings 106, 108 so as to urge the outer races of the radial ball bearings 106, 108 toward the outside of the receiving holes of the housing 115.

FIG. 5 is an enlarged view of a portion A shown in FIG. 4 and FIG. 6 shows the fundamentals of the supporting structure of the bearings shown in FIG. 4. Referring to FIG. 5 and FIG. 6, the outer race 106a of the ball bearing 106 can freely slide on the inner circumferential surface of the housing 115 in the axial direction and is urged toward the outside of the receiving holes of the housing 115 (leftward in FIG. 5) by the cone spring 117. The inner race 106b of the ball bearing 106 and the inner race 107b of the ball bearing 107 are fixed to the shaft 103 and the outer race 107a of the ball bearing 107 is fixed to the bearing housing 116. Since the cone spring 117 urges the outer race 106a leftward in FIG. 6, the shaft 103 is axially moved through the ball 106c and the inner race 106b until the axial gap and the radial gap disappear in the ball bearings 106, 107. Thereby, it is possible to reduce the clearance between the rotors 101, 102 and the clearance between the rotors 101, 102 and the housing 115. Therefore, it is able to decrease a leak of the fluid in the supercharger and the volume efficiency (the practical amount of discharged flow/the theoretical amount of discharged flow) can be improved.

Generally, when bearing steel used as a material of the outer and inner races of the bearing differs from the material of the shaft and the housing, the fit between the outer race and the housing and the fit between the inner race and the shaft become loose at high temperatures as a result of differences in the coefficients of thermal expansion between the different materials.

In particular, in case of the supercharger, a coefficient of thermal expansion of bearing steel normally used as a material of the outer race of the bearing differs from that of aluminum alloy normally used as a material of the housing. Thereby, when the temperature of the supercharger itself becomes high in operation in an atmosphere at a high temperature or in operation under high-load condition, the fit between the outer race of the bearing and the inner circumferential wall of the housing becomes loose. Further, in general, grease is sealed between the outer and the inner races of the bearing and the torque of the inner race is transmitted to the outer race through the grease (=by the agitation resistance of the grease) under the condition in which the inner race of the bearing is rotated with the shaft in a body.

Accordingly, in the above prior supporting structure, when the fit between the outer race of the bearing and the inner circumferential wall of the housing becomes loose in operation in an atmosphere at a high temperature or in operation under high-load conditions, the outer race urged by the cone spring is apt to be rotated by the agitation resistance of the grease and namely what is called, the creeping rotation of the outer race is easily generated. When the creeping rotation is generated remarkably, the fitting portion between the outer race of the ball bearing and the inner circumferential wall of the housing wears down. Therefore, in case that the above supporting structure is applied to the supercharger, for example, there exist the danger that interference between the rotors or between the rotor and the housing will occur.

SUMMARY OF INVENTION

It is, therefore, an object of the present invention to provide an improved supporting structure of bearings which overcomes the above drawback.

It is another object of the present invention to provide a supporting structure of bearings that can prevent the outer race from being rotated by the agitation resistance of the grease.

In order to achieve these objectives, there is provided a supporting structure of bearings which includes a housing, a shaft on which a rotor is fixed, a first ball bearing supported on the housing supporting one side of the shaft and having an outer race and inner race, wherein the outer race or inner race are fixed to the housing or the shaft, a second ball bearing supported on the housing supporting the other side of the shaft and having an outer race and an inner race, wherein the outer race or the inner race is slidably mounted relative to the housing or the shaft, an elastic member urging the outer race or the inner race of the second ball bearing which can slide, at least one axial groove formed on a sliding portion on which the outer race or the inner race of the second ball bearing is slid, and a spacer having a projecting portion disposed between the elastic member and the outer race or the inner race of the second ball bearing so that the projecting portion slides along the axial groove.

BRIEF DESCRIPTION OF THE DRAWINGS

Additional objects and advantages of the present invention will become more apparent from the following detailed description of a preferred embodiment thereof when considered with reference to the attached drawings, in which.

DESCRIPTION OF THE PREFERRED EMBODIMENTS

A supporting structure of bearings in accordance with a preferred embodiment of the present invention will be described with reference to attached drawings.

Figure 1:
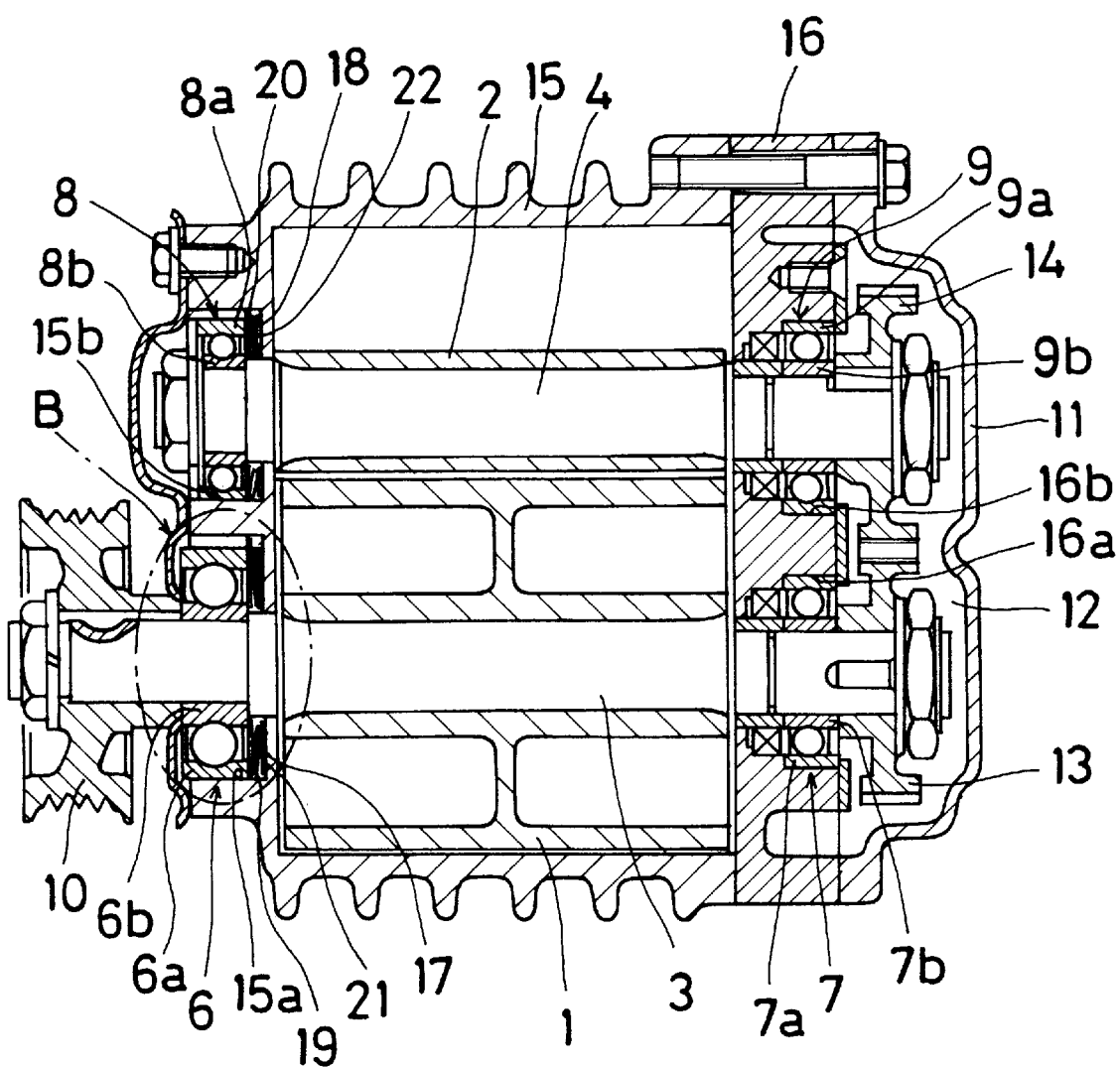
FIG. 1 is a longitudinal sectional view of an embodiment of a supporting structure of bearings in accordance with the present invention.

FIG. 1 shows a roots-typed mechanical supercharger to which a supporting structure of bearings in accordance with the present invention is applied. Referring to FIG. 1, rotors 1, 2 are fixed on shafts 3, 4, respectively and the shafts 3, 4 are rotatably supported on a housing 15 and a bearing housing 16 at both sides of the rotors 1, 2 through radial ball bearings 6, 7, 8 and 9, respectively. The housing 15 is provided with an inner bore in which the rotors 1, 2 are disposed therein and an inlet and an outlet (not shown) formed in the housing 15 are opened into the inner bore. The bearing housing 16 is fixed to an opening of the inner bore of the housing 16 so as to form operation chamber in the inner bore. At one end of the shaft 3, a driving pulley 10 is fixed thereto by a key or splines (not shown) and a nut. The other end of the shaft 3 is projected into a gear chamber 12 which is formed by the securing a cover 11 to the bearing housing 16 and a timing gear 13 is fixed to the other end of the shaft 3 by a key and a nut in the bearing housing 16. The other end of the shaft 4 is projected into the gear chamber 12 and a timing gear 14 which is engaged with the timing gear 13 is fixed to the other end of the shaft 4 by a key and a nut.

Inner races 6b, 7b, 8b and 9b of the radial ball bearings 6, 7, 8 and 9 are fitted on the shafts 3 and 4 so as not to be able to move relative to the shafts 3 and 4, respectively. Outer races 7a, 9a of the radial bearings 7 and 9 are fitted into receiving holes 16a, 16b of the bearing housing 16 so as not to be able to move relative to the bearing housing 16. The outer races 6a, 8a of the radial bearings 6 and 8 are fitted into receiving holes 15a, 15b of the housing 15 so as to be able to move in the axial direction. Now, balls are rotatably disposed between the outer races 6a, 7a, 8a and 9a and the inner races 6b, 7b, 8b and 9b and grease is sealed between the outer races 6a, 7a, 8a and 9a and the inner races 6b, 7b, 8b and 9b.

Cone springs 17, 18 are disposed between bottom surfaces of the receiving holes 15a, 15b of the housing 15 and the radial ball bearings 6, 8 so as to urge the outer races 6a, 8a of the radial ball bearings 6 and 8 through spacers 19, 20 toward the outside of the receiving holes 15a, 15b of the housing 15, respectively. The spacers 19, 20 are disposed between the cone spring 17 and the radial ball bearing 6 and between the cone spring 18 and the radial ball bearing 8 and are pressed onto the side face of the outer races 6a, 8a of the radial ball bearings 6 and 8. Thereby, the shafts 3, 4 are axially moved through the balls 6c, 8c and the inner races 6b, 8b until the axial gap and the radial gap disappear in the ball bearings 6, 7, 8 and 9. Therefore, it is possible to reduce the clearance between the rotors 1, 2 and the clearance between the rotors 1, 2 and the housing 15. Now, in the embodiment, spacers 21, 22 are disposed between the cone spring 17, 18 and the bottom surfaces of the receiving holes 15a, 15b of the housing 15, respectively.

Figure 2:
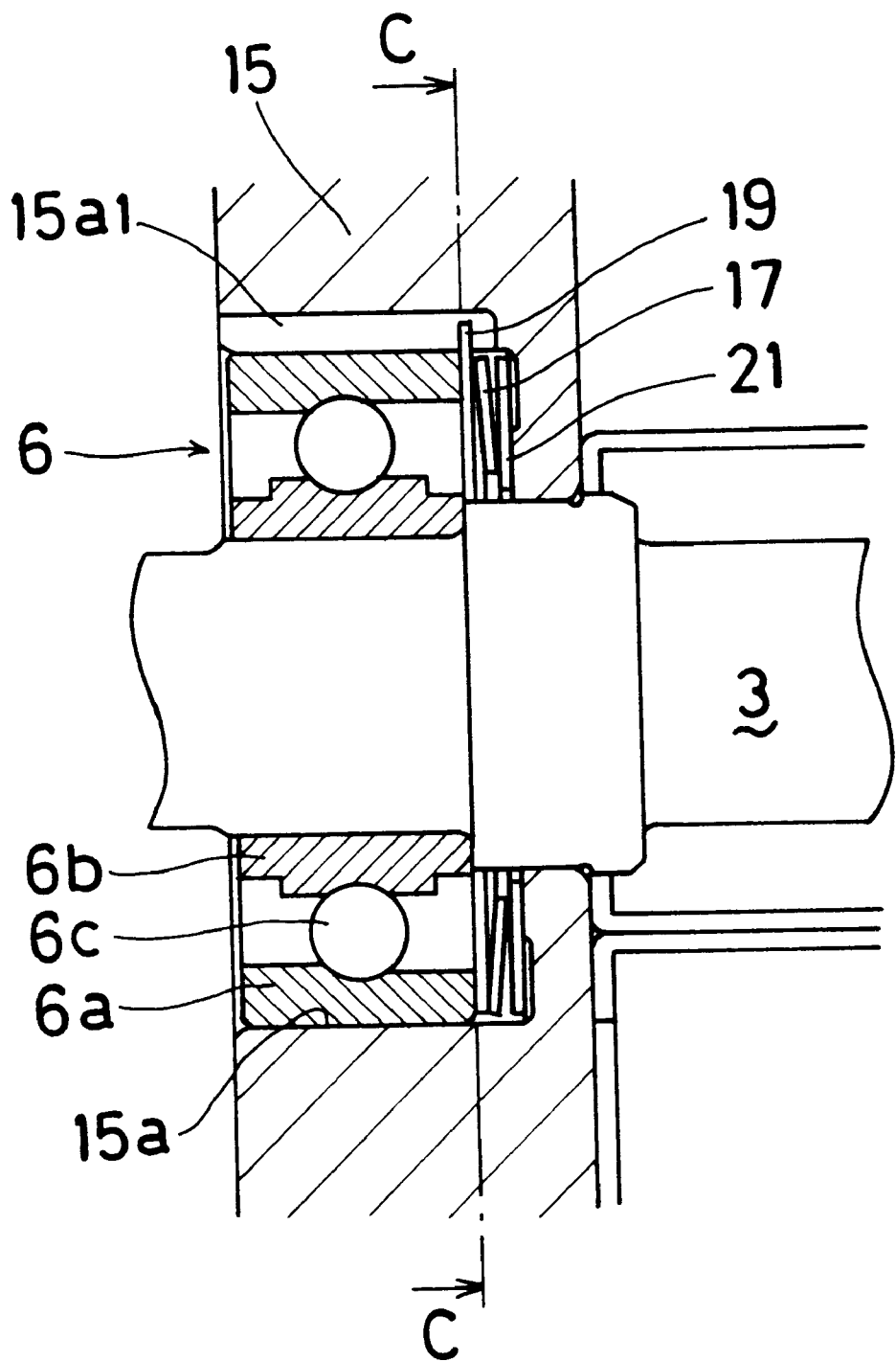
FIG. 2 is an enlarged view of a portion B shown in FIG. 1.
Figure 3:
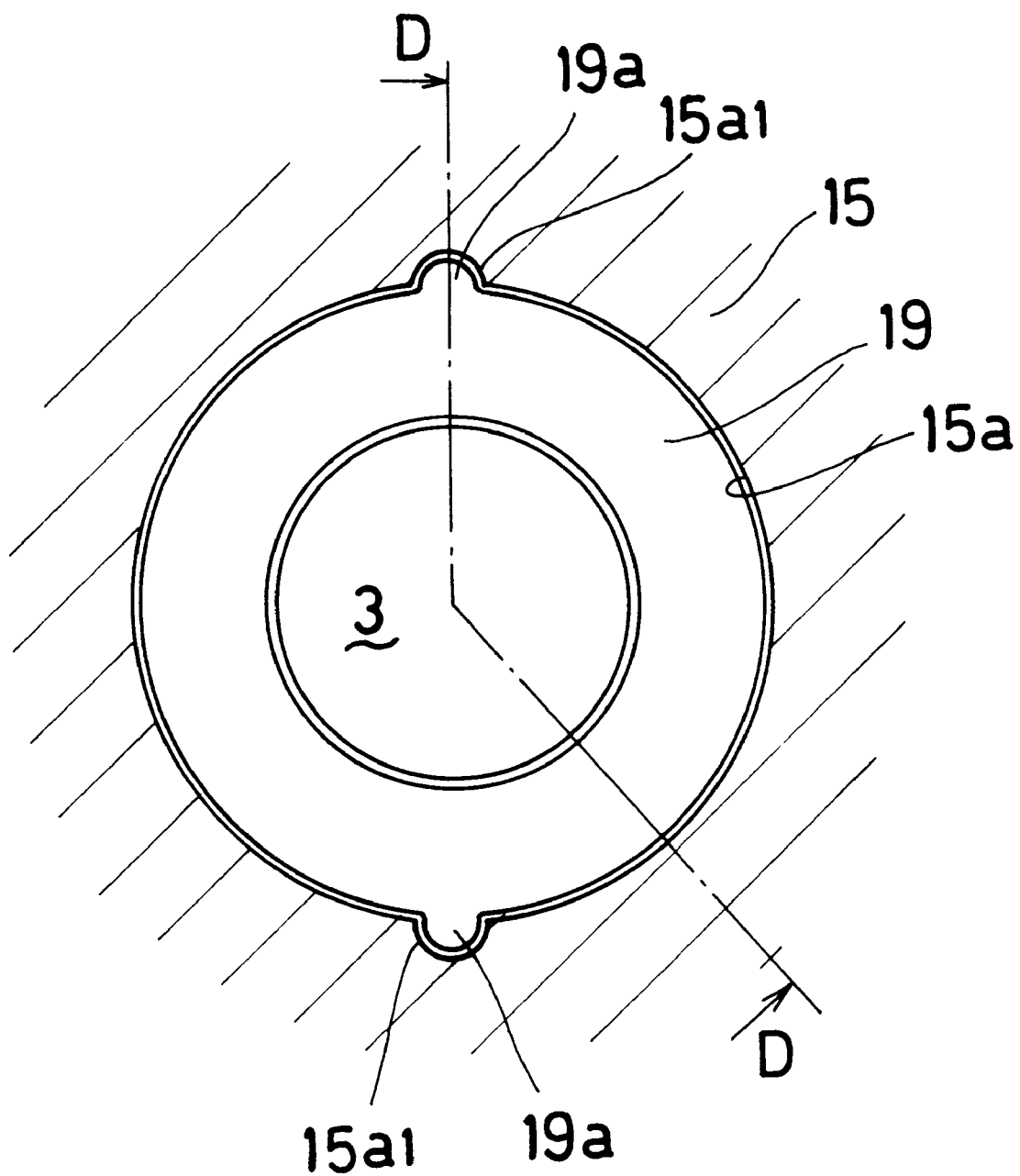
FIG. 3 is a sectional view taken substantially along the line C—C of FIG. 2.
Figure 4:
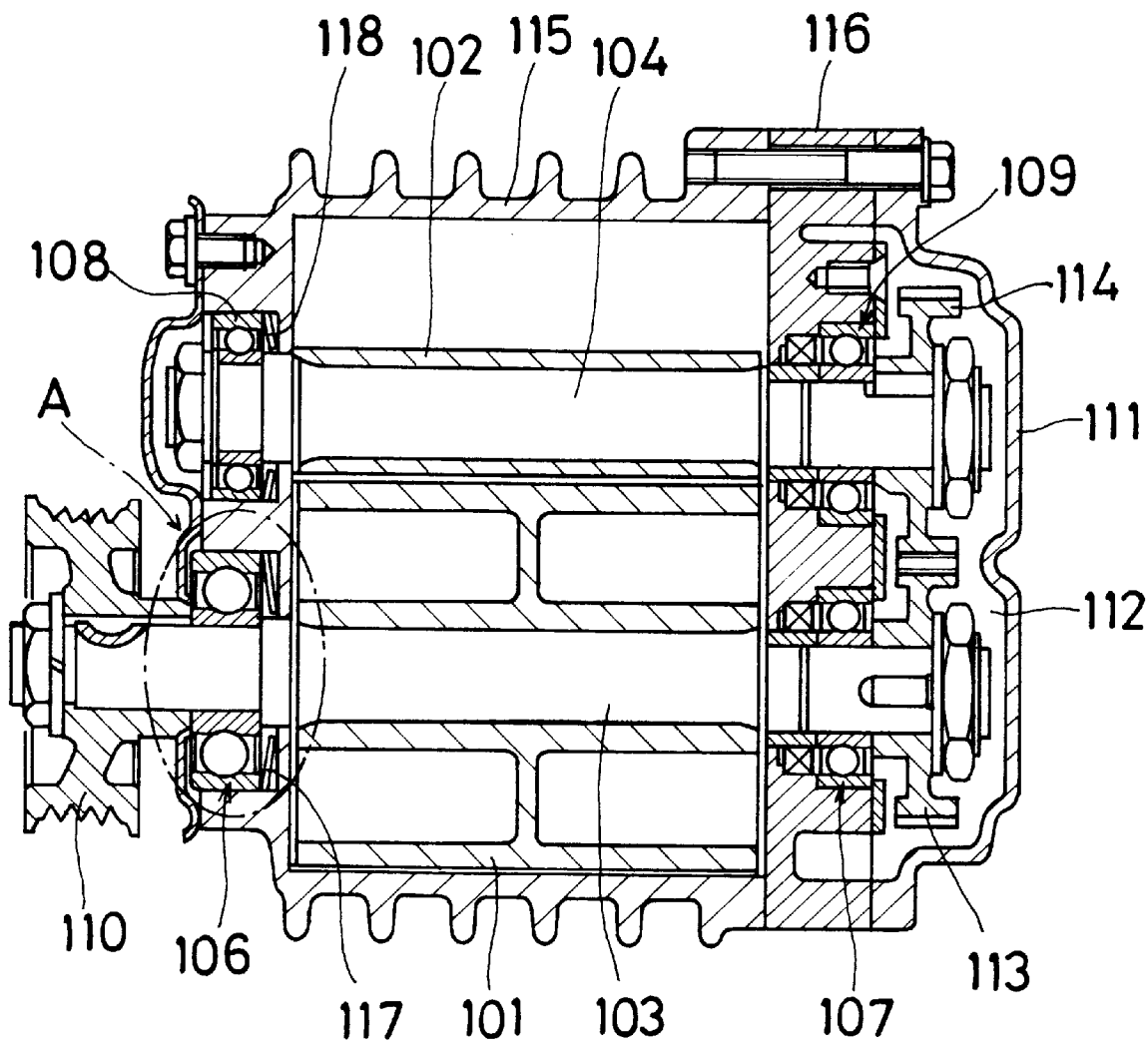
FIG. 4 is a longitudinal sectional view of a prior supporting structure of bearings.
Figure 5:
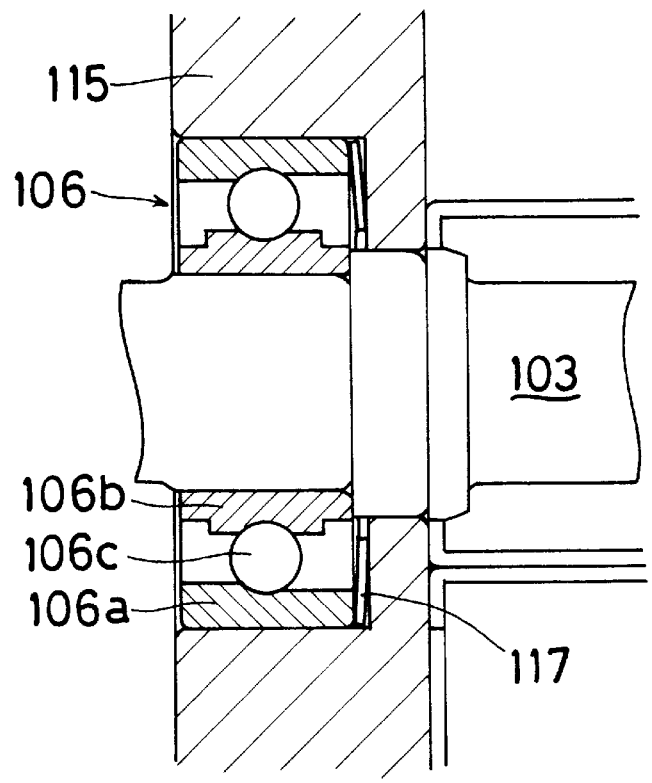
FIG. 5 is an enlarged view of a portion A shown in FIG. 4.
Figure 6:
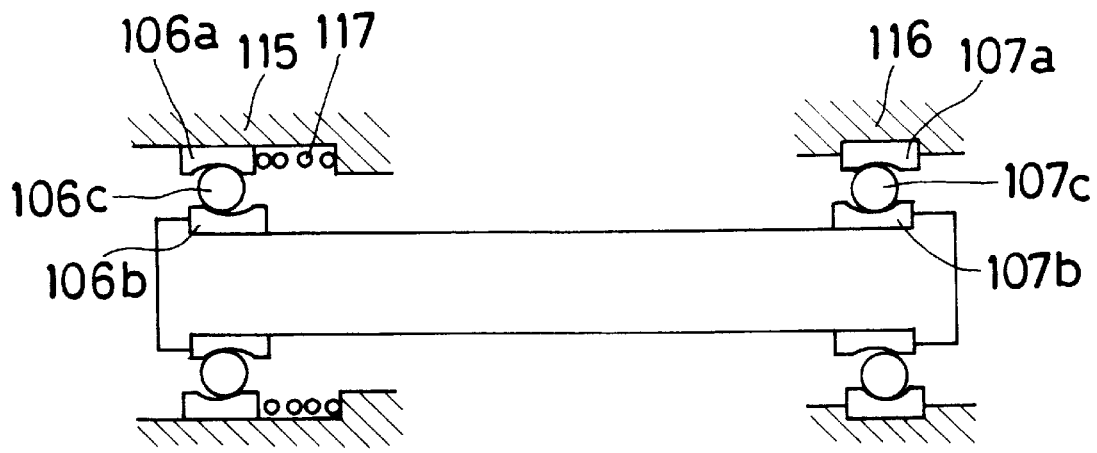
FIG. 6 shows the fundamentals of the prior supporting structure of the bearings shown in FIG. 4 and 5.

FIG. 2 is an enlarged view of a portion B shown in FIG. 1 and FIG. 3 is a sectional view taken substantially along the line C—C of FIG. 2. Now, FIG. 2 is a sectional view taken substantially along the line D—D of FIG. 3. Referring to FIG. 2 and FIG. 3, on the inner circumferential wall of the receiving hole 15a of the housing 15, a pair of axial grooves 15a1 having a semicircular sectional shape are symmetrically formed with respect to the shaft 3. Simultaneously, a pair of projecting portions 19a which is projected outward in the diametric direction are formed on the outer circumferential portion of the spacer 19 so as to be slidably fitted into the axial grooves 15a1. The projecting portions 19a have a semicircular sectional shape, respectively. One side face of the inner race 6b of the ball bearing 6 is contacted with the stepped portion between the large diameter portion and the small diameter portion of the shaft 3 to which the inner race 6b is fixed. The spacer 19 is loosely fitted onto the large diameter portion of the shaft 3 and has a inner hole whose diameter is larger than the outer diameter of the inner race 6b.

The above-described embodiment operates as follows:

When the driving force us transmitted to the pulley 10 through a driving belt (not shown), the shaft 3 is rotated with the rotor 1 and the timing gear 13 (and the inner races 6b, 7b) and the shaft 4 is simultaneously rotated with the rotor 2 and the timing gear 14 (and the inner race 8b, 9b) in the opposite direction while maintaining a predetermined clearance between the rotors 1, 2 and while maintaining a predetermined phase difference between the rotors 1, 2. At this time, since the spacer 19 is pressed onto the side face of the outer race 6a of the ball bearing 6 by the cone spring 17, a contact frictional force is generated between the outer race 6a and the spacer 19. The projecting portions 19a of the spacer 19 are slidably fitted into the axial grooves 15a1 of the receiving hole 15a of the housing 15 and therefore the spacer 19 is prevented from rotating.

Accordingly, when the fit between the outer race 6a of the ball bearing 6 and the inner circumferential wall of the receiving hole 15a of the housing 15 becomes loose due to the difference between a coefficient of thermal expansion of a material (for example, bearing steel) of the outer race 6a and that of a material (for example, aluminum alloy) of the housing 15 and the torque of the inner race 6b is transmitted to the outer race 6a through the grease (=by the agitation resistance of the grease), the outer race 6a is prevented from rotating by the contact frictional force between the outer race 6a and the spacer 19. Therefore, it is prevented that the creeping rotation of the outer race 6a is generated. Now, similar to the receiving holes 15a and the outer race 6a of the ball bearing 6, a pair of axial grooves (not shown) are formed on the inner circumferential wall of the receiving hole 15b of the housing 15 and a pair of projecting portions (not shown) are formed on the outer circumferential portion of the spacer 20. Since the effects of the axial groves (not shown) of the receiving hole 15b and the projection portions (not shown) of the spacer 20 are the same as that of the axial grooves 15a1 and the projecting portions 19a, the description is omitted.

According to the above embodiment, since the sliding portions between the outer races 6a, 8a and the inner circumferential walls of the receiving holes 15a, 15b are not worn by the creeping rotations of the outer races 6a, 8a, the condition in which the clearances between the rotors 1, 2 and the clearance between the rotors 1, 2 and the housing 15 are decreased are maintained and therefore the interferences between the rotors 1, 2 and between the rotors 1, 2 and the housing 15 are prevented. Accordingly, it is able to obtain a good operation without generating the noise due to the interference.

In the above embodiment, the outer races 6a, 8a are slidably fitted into the receiving holes 15a, 15b and are urged by cone springs 17, 18 through the spacers 19, 20 having projecting portions 19a which are slidably fitted into the axial grooves 15a1 formed on the inner circumferential walls of the receiving holes 15a, 15b. However, it is possible to slidably fit the outer races 7a, 9a of the ball bearings 7, 9 into the receiving holes of the bearing housing 16. In this case, the outer races 6a, 8a are fixed to the housing 15 and the cone springs are disposed between the bottom portions and the ball bearings 7, 9 so as to urge the outer races 7a, 9a, respectively. Further, a pair of axial grooves are formed on the inner circumferential walls of the receiving holes of the bearing housing 16 and spacers having a pair of projecting portions which are slidably fitted into the axial grooves are disposed between the ball bearings 7, 9 and the cone springs.

As mentioned above, in the present invention, the outer race or the inner race of the second ball bearing is urged by the elastic member through the spacer and the axial groove is formed on a sliding portion on which the outer race or the inner race of the second bearing is slid. The spacer is provided with the projecting portion which can slide along the axial groove. Therefore, since the spacer, which is prevented from rotating by the engagement between the projecting portion and the axial groove is pressed onto the outer race or the inner race of the second ball bearing, the outer race or the inner race of the second ball bearing is prevented from rotating by the contact frictional force between the outer race or the inner race and the second ball bearing and the spacer. Accordingly, when the present invention is applied to the mechanical supercharger and the outer race of the second bearing is slidably fitted in the housing and the inner race of the second bearing is fixed to the shaft, even though the fit between the outer race of the second ball bearing and the housing becomes loose at a high temperature and the torque of the inner race of the second ball bearing is transmitted to the outer race through the grease (=by the agitation resistance of the grease), the outer race is prevented from rotating by the contact frictional force between the outer race and the spacer. Therefore, the creeping rotation of the outer race is prevented. Thereby, the condition in which the clearances between the rotors and the clearance between the rotors and the housing are decreased are maintained and therefore optimum operation is obtained without generating noise due to interference. Further, a mechanical supercharger which is endurable the operation in an atmosphere at a high temperature and the operation under high loading may be achieved.

The principles, a preferred embodiment and modes of operation of the present invention have been described in the foregoing description. The invention which is intended to be protected herein should not, however, be construed as limited to the particular formes disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A supporting structure of bearings comprising:

a housing;

a shaft on which a rotor is fixed;

a first ball bearing supported on the housing supporting one side of the shaft and having an outer race and an inner race, wherein the outer race and inner race are fixed to the housing and the shaft, respectively;

a second ball bearing supported on the housing supporting the other side of the shaft and having an outer race and an inner race, wherein the outer race is slidably mounted in a supporting bore of the housing and the inner race is fixed to the shaft; and means for continuously absorbing an axial gap and a radial gap in the first and second ball bearings, said absorbing means including an elastic member for maintaining an urging force against the outer race of the second ball bearing in an axial direction relative to the inner race of the second ball bearing, and a ring spacer having at least one radial projecting portion disposed between the elastic member and the outer race of the second ball bearing and an axial groove formed on an inner circumference of the supporting bore of the housing for receiving the radial projecting portion whereby the radial projecting portion slides along the axial groove, wherein the ring spacer is operatively positioned between the elastic member and the outer race of the second ball bearing such that the elastic member continuously urges the outer race of the second ball bearing in the axial relative to the inner race of the second ball bearing via the ring spacer and the outer race of the second ball bearing is maintained in frictional contact with the ring spacer so as to prevent rotation of the outer race relative to the ring spacer.

2. A supporting structure of bearings recited in claim 1, wherein the inner races of the first and second ball bearings are fixed to the shaft, the outer race of the first ball bearing is fixed to the housing and the axial groove is formed in a hole of the housing in which the outer race of the second ball bearing is slidably fitted.

3. A supporting structure of bearings recited in claim 2, wherein a pair of axial grooves are symmetrically formed in a hole of the housing with respect to the shaft and a pair of projecting portions are symmetrically formed on the outer circumferential portion of the spacer so as to be slidably fitted into the axial grooves.

4. A supporting structure of bearings recited in claim 3, further comprising an additional shaft on which an additional rotor is fixed, a third ball bearing supported on the housing supporting one side of the additional shaft and having an outer race and inner race, a fourth ball bearing supported on the housing supporting the other side of the additional shaft and having an outer race and an inner race and a driving force transmitting means for transmitting a driving force from the shaft to the additional shaft so that the rotor and the additional rotor are rotated in the housing while a predetermined clearance between the rotor and the additional rotor is maintained.

5. A supporting structure of bearings according to claim 1, wherein the ring spacer is a leaf plate.

* * * * *